US012768668B2

(12) United States Patent
Takei et al.

(10) Patent No.: US 12,768,668 B2
(45) Date of Patent: Oct. 20, 2026

(54) IMAGING DEVICE, IMAGING WORK ASSISTANCE METHOD, AND STORAGE MEDIUM STORING IMAGING WORK ASSISTANCE PROGRAM

(71) Applicant: PANASONIC INTELLECTUAL PROPERTY MANAGEMENT CO., LTD., Osaka (JP)

(72) Inventors: Ichiro Takei, Tokyo (JP); Akihiro Furuta, Kanagawa (JP); Kensho Teranishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 19/129,181

(22) PCT Filed: Nov. 2, 2023

(86) PCT No.: PCT/JP2023/039653

§ 371 (c)(1),
(2) Date: May 12, 2025

(87) PCT Pub. No.: WO2024/106223

PCT Pub. Date: May 23, 2024

(65) Prior Publication Data

US 2026/0153351 A1 Jun. 4, 2026

(30) Foreign Application Priority Data

Nov. 16, 2022 (JP) ................................ 2022-183450
Nov. 16, 2022 (JP) ................................ 2022-183467
Nov. 16, 2022 (JP) ................................ 2022-183480

(51) Int. Cl.
*G01C 21/00* (2006.01)

(52) U.S. Cl.
CPC ...... *G01C 21/3811* (2020.08); *G01C 21/3837* (2020.08); *G01C 21/3856* (2020.08)

(58) Field of Classification Search
CPC ............ G01C 21/3811; G01C 21/3837; G01C 21/3856
See application file for complete search history.

(56) References Cited

U.S. PATENT DOCUMENTS 8,380,384 B2 * 2/2013 Lee ...................... G05D 1/0253 701/28
8,565,958 B1 * 10/2013 Montemerlo .......... G05D 1/024 701/28

(Continued)

FOREIGN PATENT DOCUMENTS

JP 6639734 2/2020

OTHER PUBLICATIONS

International Search Report (ISR) from International Searching Authority (Japan Patent Office) in International Pat. Appl. No. PCT/JP2023/039653, dated Dec. 12, 2023, together with an English language translation.

(Continued)

*Primary Examiner* — Bhavesh V Amin
(74) *Attorney, Agent, or Firm* — Greenblum & Bernstein, P.L.C.

(57) ABSTRACT

Provided is an imaging device for imaging spots in a measurement target site, thereby allowing a 3D measurement operation to be performed for generating 3D space information based on captured images of those spots, configured to display an imaging screen that clearly indicates that there is a region for which a loop closing operation is necessary, to a user conducting imaging work to facilitate the user's proper imaging work, thereby improving the accuracy of a 3D measurement operation using SLAM. The imaging work includes, while moving in a measurement (Continued)

target site with holding an imaging device body, causing a visible ray camera to image spots in the measurement target site on spot by spot. The imaging screen includes a main window and a sub-window which display support images which visualize a processed region which has been subjected to a loop closing operation in the 3D measurement operation as the support information.

20 Claims, 9 Drawing Sheets

(56) References Cited

U.S. PATENT DOCUMENTS 8,655,094 B2 * 2/2014 Miller ........................ G06T 7/80 382/152
8,774,517 B1 * 7/2014 Khosla .................... G06V 20/52 348/231.3
8,787,700 B1 * 7/2014 Aly ........................... G06T 7/38 382/294
8,824,802 B2 * 9/2014 Kutliroff ................ G06V 20/64 348/46
8,825,391 B1 * 9/2014 Urmson ............. G01C 21/3822 701/448
9,026,941 B1 * 5/2015 Krueger .................. G06F 16/00 715/963
9,058,563 B1 * 6/2015 Krueger .............. G06F 16/9537
9,076,212 B2 * 7/2015 Ernst ...................... A61B 5/055
9,280,576 B2 * 3/2016 Trotta ................. G06F 16/2365
9,378,431 B2 * 6/2016 Stoeffler ................. G06F 16/50
9,420,265 B2 * 8/2016 Taguchi .................. G06T 7/337
9,519,289 B2 * 12/2016 Munich .................. B25J 19/005
9,607,428 B2 * 3/2017 Li ...................... G02B 27/0093
9,751,210 B2 * 9/2017 Fong ...................... B25J 9/1602
9,965,689 B2 * 5/2018 dos Santos Mendonca ................ G01C 21/1652
11,423,005 B2 8/2022 Naruse et al.
11,953,910 B2 * 4/2024 Zhang .................. G01C 21/005
2007/0156286 A1 * 7/2007 Yamauchi ............ G05D 1/0038 700/245
2008/0249732 A1 * 10/2008 Lee ...................... G01C 25/005 702/96
2009/0234499 A1 * 9/2009 Nielsen .................... B25J 9/161 700/250
2009/0285450 A1 * 11/2009 Kaiser .................. G01C 21/005 348/169
2010/0045701 A1 * 2/2010 Scott ......................... G06T 7/80 348/135
2010/0094460 A1 * 4/2010 Choi ...................... B25J 9/1692 700/251
2010/0121601 A1 * 5/2010 Eckert .................. G01C 21/188 701/500
2010/0220173 A1 * 9/2010 Anguelov ................. G06T 7/70 348/148
2011/0044543 A1 * 2/2011 Nakamura ........... G06V 20/588 382/190
2011/0288684 A1 * 11/2011 Farlow ................... B25J 11/009 901/1
2012/0201469 A1 * 8/2012 Livet .................... G06V 10/751 382/201
2013/0120736 A1 * 5/2013 Bosse ..................... G01S 17/89 250/336.1
2013/0282208 A1 * 10/2013 Mendez-Rodriguez ..................... G01S 17/88 701/16
2013/0335554 A1 * 12/2013 Brunner ............. H04N 23/6812 348/135
2014/0207282 A1 * 7/2014 Angle .................. B25J 11/0085 901/1
2014/0369557 A1 * 12/2014 Kayombya ............... G06T 7/73 382/103
2015/0012209 A1 * 1/2015 Park ....................... G01C 21/20 701/408
2015/0071524 A1 * 3/2015 Lee ......................... G06T 7/593 382/154
2015/0219767 A1 * 8/2015 Humphreys .......... G01S 19/485 342/357.26
2015/0221133 A1 * 8/2015 Groten .................. G06T 19/006 345/633
2015/0268058 A1 * 9/2015 Samarasekera ........ G01C 11/02 701/409
2015/0369609 A1 * 12/2015 Roumeliotis ...... G01C 21/1656 701/400
2016/0144511 A1 * 5/2016 Romanov .............. B25J 9/1697 701/28
2016/0188977 A1 * 6/2016 Kearns ................... B25J 11/002 348/113
2016/0209217 A1 * 7/2016 Babu .................. G01C 21/1656
2016/0246302 A1 * 8/2016 Liao ....................... G01C 21/20
2016/0327653 A1 * 11/2016 Humphreys ............ G01S 19/54
2016/0364835 A1 * 12/2016 Srebnik ............... G06F 11/1008
2017/0010109 A1 * 1/2017 Hayon ................... G01C 21/30
2017/0028556 A1 * 2/2017 Summer .................. B25J 5/005
2017/0089948 A1 * 3/2017 Ho ....................... G01C 25/005
2017/0157769 A1 * 6/2017 Aghamohammadi ....................... B25J 9/1664
2017/0206418 A1 * 7/2017 Schnittman ............ B25J 19/023
2017/0272660 A1 * 9/2017 Ishihara .................. G06T 11/60
2017/0277197 A1 * 9/2017 Liao ..................... G05D 1/0251
2017/0357873 A1 * 12/2017 Roimela .................... G06T 7/20
2018/0035606 A1 * 2/2018 Burdoucci ........... A01D 34/008
2018/0074508 A1 * 3/2018 Kleiner ............... A47L 11/4011
2018/0082128 A1 * 3/2018 Cameron ............... G06V 20/52
2018/0158197 A1 * 6/2018 Dasgupta .............. B64C 39/024
2018/0188032 A1 * 7/2018 Ramanandan .......... G01S 19/52
2018/0224286 A1 * 8/2018 Pickering ............. G01C 21/367
2018/0231385 A1 * 8/2018 Fourie .................. G01C 21/188
2018/0239355 A1 * 8/2018 Lee ...................... G01C 21/005
2022/0261002 A1 * 8/2022 Zhang .................. G01C 21/005
2023/0176550 A1 * 6/2023 Cella ................ G05B 19/41885 700/117
2023/0176557 A1 * 6/2023 Cella ................ G05B 19/41885 700/117
2023/0195058 A1 * 6/2023 Cella ................ G05B 19/41885 700/43
2023/0351706 A1 * 11/2023 Babinowich ............ G06T 7/579
2024/0353838 A1 * 10/2024 Zhang .................... G05D 1/648

OTHER PUBLICATIONS

Sato, "SSII2015 Tutorial, Sequential Three-dimensional Reproduction from Motion Image by Feature Point Tracking, and Application Thereof, from Basics of Coordinate System to Application Case Examples and Recent Research Tendency," Image Sensing Symposium Tutorial Lecture Meeting, Jun. 10, 2015, together with an English language translation.

* cited by examiner

IMAGING DEVICE, IMAGING WORK ASSISTANCE METHOD, AND STORAGE MEDIUM STORING IMAGING WORK ASSISTANCE PROGRAM

TECHNICAL FIELD

The present disclosure relates to an imaging device for imaging spots in a measurement target site, thereby allowing a 3D measurement operation to be performed for generating 3D space information on the measurement target site based on captured images of the spots therein, as well as an imaging work assistance method and an imaging work assistance program for assisting a user to conduct imaging work using the imaging device.

BACKGROUND ART

Known 3D measurement technologies include a technology that generates 3D space information (map data) related to a measurement target site based on captured images thereof. In the field of 3D measurement technology, SLAM (Simultaneous Localization And Mapping) methods have attracted attention in recent years. In such SLAM methods, a mobile vehicle that carries an imaging device is used, and 3D space information and information on the position of the vehicle are generated as measurement results based on captured images of spots of a measurement target site captured by the imaging device. In some SLAM methods, a user carries a portable imaging device, and conducts imaging work by capturing images with the imaging device while moving around a measurement target site, thereby enabling easy 3D measurements.

However, in 3D measurements using such an SLAM method, self-relative-position estimation operations are repeatedly performed, which inevitably results in accumulation of errors. Such accumulation of errors in self-position estimation can cause a significant drop in the accuracy of results of 3D measurements.

When errors occur during the process of creation of 3D space information (map data), one of the prior-art methods for reducing the accuracy degradation caused by such a cumulative error enables the creation of 3D space information (map data) to be restarted from the middle of the process, without having to start from the beginning again (Patent Document 1). This prior-art technology detects an event (lost) that causes an error and presents a period during which the event occurred to a user, which enables the user to identify the position at which to start over with the creation of the 3D space information.

Other methods for reducing the accuracy degradation caused by a cumulative error include loop closing technology (Non-Patent Document 1). A method of the loop closing technology is configured such that, when the movement path of an imaging device forms a loop, i.e., when the imaging device moves and returns to a spot at which an image was previously captured, assuming that the self-position estimation result (past position) acquired based on the image previously captured at the spot is a correct position, the method corrects the positions along the path from the current position to the past position, thereby eliminating the cumulative error. This method can eliminate the need to restart the process of imaging from the middle as the technology disclosed in Patent Document 1.

PRIOR ART DOCUMENT(S)

Patent Document(s)

Patent Document 1: JP6639734B

Non-Patent Document(s)

Non-Patent Document 1: SATO, Tomokazu, "SSII 2015 Tutorial, Sequential Three-dimensional Reproduction from Motion Image by Feature Point Tracking, and Application Thereof, from Basics of Coordinate System to Application Case Examples and Recent Research Tendency", Jun. 10, 2015, Image Sensing Symposium Tutorial Lecture Meeting

SUMMARY OF THE INVENTION

Task to Be Accomplished by the Invention

In 3D measurements using SLAM methods, the loop closing technology is useful in reducing the accuracy degradation caused by a cumulative error, as disclosed in Patent Document 1. A loop closing operation can be performed only when the movement path of an imaging device forms a loop, i.e., only when the imaging device returns to a spot at which an image was previously captured. For this reason, it is important to deliberately create a situation in which the loop closing operation can be performed. Thus, there has been a need to clearly indicate that there is a region for which a loop closing operation is necessary, to a user that is conducting imaging work. However, there has been no solution to meet such a need in the prior art.

The present disclosure has been made in view of the problem of the prior art, and a primary object of the present disclosure is to provide an imaging device, an imaging work assistance method, and an imaging work assistance program that can clearly indicate that there is a region for which a loop closing operation is necessary, to a user conducting imaging work to facilitate proper imaging work, thereby improving the accuracy of a 3D measurement operation using SLAM.

Means to Accomplish the Task

An aspect of the present invention provides an imaging device for imaging spots in a measurement target site, thereby allowing a 3D measurement operation to be performed for generating 3D space information on the measurement target site based on captured images of the spots therein, the imaging device comprising: an imaging device body held by a user; an imaging module provided in the imaging device body to image the measurement target site; a display device for displaying support information related to imaging work to be conducted by the user, the imaging work including, while moving in the measurement target site with holding the imaging device body, causing the imaging module to image spots in the measurement target site on a spot-by-spot basis; and a processor for controlling the imaging module and the display device, wherein the processor causes a support image which visualizes a processed region which has been subjected to a loop closing operation in the 3D measurement operation to be displayed on the display device as the support information.

Another aspect of the present invention provides an imaging work assistance method in which a processor performs operations to assist a user to conduct imaging work which includes, while moving in a measurement target site with holding an imaging device, causing the imaging device to image spots in the measurement target site on a spot-by-spot basis, thereby allowing a 3D measurement operation to be performed for generating 3D space information on the measurement target site based on captured images of the spots therein, the method comprising: the processor causing a support image which visualizes a processed region which has been subjected to a loop closing operation in the 3D measurement operation to be displayed on a display device as support information related to the imaging work.

Yet another aspect of the present invention provides an imaging work assistance program that causes a processor to perform operations to assist a user to conduct imaging work which includes, while moving in a measurement target site with holding an imaging device, causing the imaging device to image spots in the measurement target site on a spot-by-spot basis, thereby allowing a 3D measurement operation to be performed for generating 3D space information on the measurement target site based on captured images of the spots therein, the operations comprising: causing a support image which visualizes a processed region which has been subjected to a loop closing operation in the 3D measurement operation, to be displayed on a display device as support information related to the imaging work.

Effect of the Invention

According to the present disclosure, a support image clearly indicates that there is a region for which a loop closing operation is necessary, to a user (worker) that is conducting imaging work to facilitate proper imaging work. The support image enables the user to conduct proper imaging work, thereby improving the accuracy of a 3D measurement operation using SLAM.

DESCRIPTION OF THE PREFERRED EMBODIMENT(S)

Figure 1:
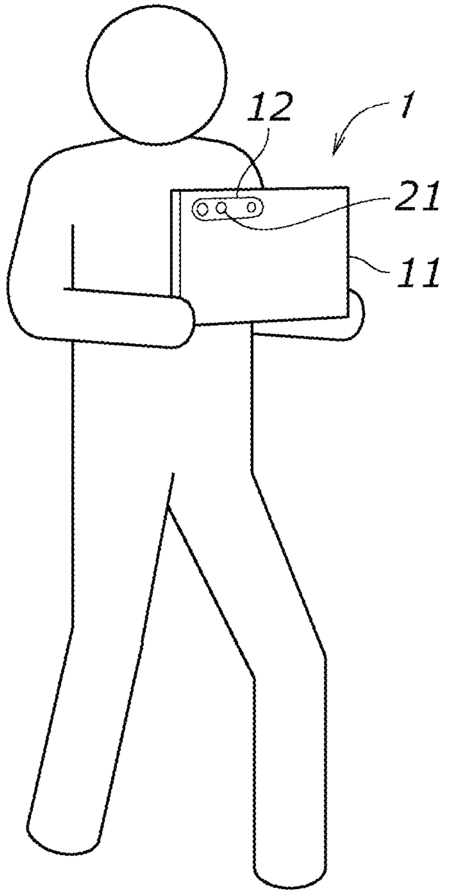
FIG. 1 is an explanatory diagram showing a status of imaging work using an imaging device in accordance with an embodiment of the present disclosure.

A first aspect of the present disclosure made to achieve the above-described object is an imaging device for imaging spots in a measurement target site, thereby allowing a 3D measurement operation to be performed for generating 3D space information on the measurement target site based on captured images of the spots therein, the imaging device comprising: an imaging device body held by a user; an imaging module provided in the imaging device body to image the measurement target site; a display device for displaying support information related to imaging work to be conducted by the user, the imaging work including, while moving in the measurement target site with holding the imaging device body, causing the imaging module to image spots in the measurement target site on a spot-by-spot basis; and a processor for controlling the imaging module and the display device, wherein the processor causes a support image which visualizes a processed region which has been subjected to a loop closing operation in the 3D measurement operation to be displayed on the display device as the support information.

According to this configuration, a support image clearly indicates that there is a region for which a loop closing operation is necessary, to a user (worker) that is conducting imaging work to facilitate the user's proper imaging work. The support image enables the user to conduct proper imaging work, thereby improving the accuracy of a 3D measurement operation using SLAM. A processed region which has been subjected to the loop closing operation is visualized in a form of an area or a form of a movement path.

A second aspect of the present disclosure is the imaging device of the first aspect, wherein the processor causes the support image, which visualizes the processed region, which has been subjected to the loop closing operation in a currently captured image and/or a bird's-eye image generated from results of the 3D measurement operation, to be displayed on the display device.

This configuration clearly presents to the user the processed region, which has been subjected to the loop closing operation. In this case, the processed region may be visualized in color, for example. In addition, the bird's-eye image may be a bird's-eye point cloud image, a bird's-eye point cloud path image, or a bird's-eye path image.

A third aspect of the present disclosure is the imaging device of the first aspect, wherein the processor visualizes the processed region, which has been subjected to the loop closing operation, in a different display form from a recommended region for which the loop closing operation is recommended to be performed.

This configuration clearly presents to the user the processed region, which has been subjected to the loop closing operation. In this case, the processed region may be visualized in a different color from the recommended region, for which the loop closing operation is recommended to be performed, for example.

A fourth aspect of the present disclosure is the imaging device of the first aspect, wherein the processor acquires a number of times the loop closing operation has been performed in the processed region, which has been subjected to the loop closing operation.

This configuration clearly presents to the user the number of times the loop closing operation has been performed in the processed region, which has been subjected to the loop closing operation. In this case, the processor can acquire the number of times the loop closing operation has been performed at each spot (in each captured image). In some cases, the processor can acquire the number of times the loop closing operation has been performed at each point in point cloud image data, the image being captured as the 3D space information.

A fifth aspect of the present disclosure is the imaging device of the second aspect, wherein the processor changes a display form in which the processed region, which has been subjected to the loop closing operation, is displayed, depending on a number of times the loop closing operation has been performed.

This configuration clearly presents to the user a processing count which is the number of times the loop closing operation has been performed in the processed region, which has been subjected to the loop closing operation. In this case, examples of the change in the display form may include changes in display colors. For example, a region for which the processing count is one is visualized in green, and a region for which the processing count is two is visualized in blue, while one for which the processing count is zero in red.

A sixth aspect of the present disclosure is the imaging device of the first aspect, wherein the processor generates a support message that prompts the user to conduct the imaging work required for the loop closing operation in the 3D measurement operation, and causes the support message to be displayed on the display device as the support information.

In this configuration, a support message clearly indicates that there is a region for which a loop closing operation is necessary, to a user (worker) that is conducting imaging work to facilitate the user's proper imaging work. The support message enables the user to conduct proper imaging work, thereby improving the accuracy of a 3D measurement operation using SLAM.

A seventh aspect of the present disclosure is the imaging device of the sixth aspect, wherein the processor generates the support message that prompts the user to conduct the imaging work with a recommended region for which the loop closing operation is recommended to be performed, and causes the support message to be displayed on the display device.

This configuration clearly presents to a user a region for which a loop closing operation is necessary.

An eighth aspect of the present disclosure is the imaging device of the sixth aspect, wherein the processor causes the support image which visualizes a recommended region for which the loop closing operation is recommended to be performed in a currently captured image and/or a bird's-eye image generated from results of the 3D measurement operation, to be displayed on the display device.

This configuration clearly presents to a user a region for which a loop closing operation is necessary. In this case, the recommended region may displayed in color, for example. The recommended region, for which the loop closing operation is recommended to be performed, is visualized in a form of an area or a form of a movement path. In addition, the bird's-eye image may be a bird's-eye point cloud image, a bird's-eye point cloud path image, or a bird's-eye path image.

A ninth aspect of the present disclosure is the imaging device of the sixth aspect, wherein the processor enlarges one of a currently captured image and/or a bird's-eye image generated from results of the 3D measurement operation and places the enlarged image in a main image display frame and reduces the other and places the reduced image in a sub-image display frame, and wherein, in response to the user's operation, the processor switches the places of the currently captured image and the bird's-eye image, between the main image display frame and sub-image display frame.

This configuration allows a user to switch the places of the image the user wants to see as a primary source of information and the image the user wants to see as reference depending on what the user wants to know, which makes the device more convenient for the user.

A tenth aspect of the present disclosure is the imaging device of the ninth aspect, wherein, in response to the user's operation, the processor makes the sub-image display frame hidden.

An eleventh aspect of the present disclosure is the imaging device of the first aspect, wherein the processor causes a support image which visualizes a recommended region for which the loop closing operation is recommended to be performed in the 3D measurement operation, to be displayed on the display device as the support information.

In this configuration, a support image clearly indicates that there is a region for which a loop closing operation is necessary, to a user (worker) that is conducting imaging work to facilitate the user's proper imaging work. The support image enables the user to conduct proper imaging work, thereby improving the accuracy of a 3D measurement operation using SLAM. A processed region which has been subjected to the loop closing operation is visualized in a form of an area or a form of a movement path.

A twelfth aspect of the present disclosure is the imaging device of the eleventh aspect, wherein the processor visualizes an unprocessed region which has not been subjected to the loop closing operation, as the recommended region, for which the loop closing operation is recommended to be performed.

This configuration properly presents to a user a recommended region, for which the loop closing operation is recommended to be performed.

A thirteenth aspect of the present disclosure is the imaging device of the eleventh aspect, wherein the processor visualizes a region in which the accuracy of the results of the 3D measurement operation is low, as the recommended region, for which the loop closing operation is recommended to be performed.

This configuration properly presents to a user a recommended region, for which the loop closing operation is recommended to be performed.

A fourteenth aspect of the present disclosure is the imaging device of the eleventh aspect, wherein the processor visualizes the recommended region, for which the loop closing operation is recommended to be performed, in a different display form from the processed region, which has been subjected to the loop closing operation.

This configuration properly presents to a user a recommended region, for which the loop closing operation is recommended to be performed. In this case, the recommended region may be visualized in a different color from the processed region, which has been subjected to the loop closing operation, for example.

A fifteenth aspect of the present disclosure is an imaging work assistance method in which a processor performs operations to assist a user to conduct imaging work which includes, while moving in a measurement target site with holding an imaging device, causing the imaging device to image spots in the measurement target site on a spot-by-spot basis, thereby allowing a 3D measurement operation to be performed for generating 3D space information on the measurement target site based on captured images of the spots therein, the method comprising: the processor causing a support image which visualizes a processed region which has been subjected to a loop closing operation in the 3D measurement operation to be displayed on a display device as support information related to the imaging work.

According to this configuration, a support image clearly indicates that there is a region for which a loop closing operation is necessary, to a user that is conducting imaging work to facilitate the user's proper imaging work, enabling the user to conduct proper imaging work, to thereby improve the accuracy of a 3D measurement operation using SLAM, in the same manner as the first aspect.

A sixteenth aspect of the present disclosure is the method of the sixth aspect, wherein the processor generates a support message that prompts the user to conduct the imaging work required for the loop closing operation in the 3D measurement operation, and causes the support message to be displayed on the display device as the support information related to the imaging work.

In this configuration, a support message clearly indicates that there is a region for which a loop closing operation is necessary, to a user (worker) that is conducting imaging work to facilitate the user's proper imaging work, enabling the user to conduct proper imaging work, to thereby improve the accuracy of a 3D measurement operation using SLAM, in the same manner as the sixth aspect.

A seventeenth aspect of the present disclosure is the method of the fifteenth aspect, wherein the processor causes the support image which visualizes a recommended region for which the loop closing operation is recommended to be performed, to be displayed on the display device as the support information related to the imaging work.

In this configuration, a support message clearly indicates that there is a region for which a loop closing operation is necessary, to a user (worker) that is conducting imaging work to facilitate the user's proper imaging work, enabling the user to conduct proper imaging work, to thereby improve the accuracy of a 3D measurement operation using SLAM, in the same manner as the eleventh aspect.

An eighteenth aspect of the present disclosure is an imaging work assistance program that causes a processor to perform operations to assist a user to conduct imaging work which includes, while moving in a measurement target site with holding an imaging device, causing the imaging device to image spots in the measurement target site on a spot-by-spot basis, thereby allowing a 3D measurement operation to be performed for generating 3D space information on the measurement target site based on captured images of the spots therein, the operations comprising: causing a support image which visualizes a processed region which has been subjected to a loop closing operation in the 3D measurement operation, to be displayed on a display device as support information related to the imaging work.

According to this configuration, a support image clearly indicates that there is a region for which a loop closing operation is necessary, to a user that is conducting imaging work to facilitate the user's proper imaging work, enabling the user to conduct proper imaging work, to thereby improve the accuracy of a 3D measurement operation using SLAM, in the same manner as the first aspect.

A nineteenth aspect of the present disclosure is the imaging work assistance program of the eighteenth aspect, wherein the operations comprise generating a support message that prompts the user to conduct the imaging work required for the loop closing operation in the 3D measurement operation, and causing the support message to be displayed on the display device as the support information related to the imaging work.

In this configuration, a support message clearly indicates that there is a region for which a loop closing operation is necessary, to a user (worker) that is conducting imaging work to facilitate the user's proper imaging work, enabling the user to conduct proper imaging work, to thereby improve the accuracy of a 3D measurement operation using SLAM, in the same manner as the sixth aspect.

A twentieth aspect of the present disclosure is the imaging work assistance program of the eighteenth aspect, wherein the operations comprise causing the support image which visualizes a recommended region for which the loop closing operation is recommended to be performed, to be displayed on the display device as the support information related to the imaging work.

According to this configuration, a support image clearly indicates that there is a region for which a loop closing operation is necessary, to a user that is conducting imaging work to facilitate the user's proper imaging work, enabling the user to conduct proper imaging work, to thereby improve the accuracy of a 3D measurement operation using SLAM, in the same manner as the eleventh aspect.

Embodiments of the present disclosure will be described below with reference to the drawings.

Figure 2:
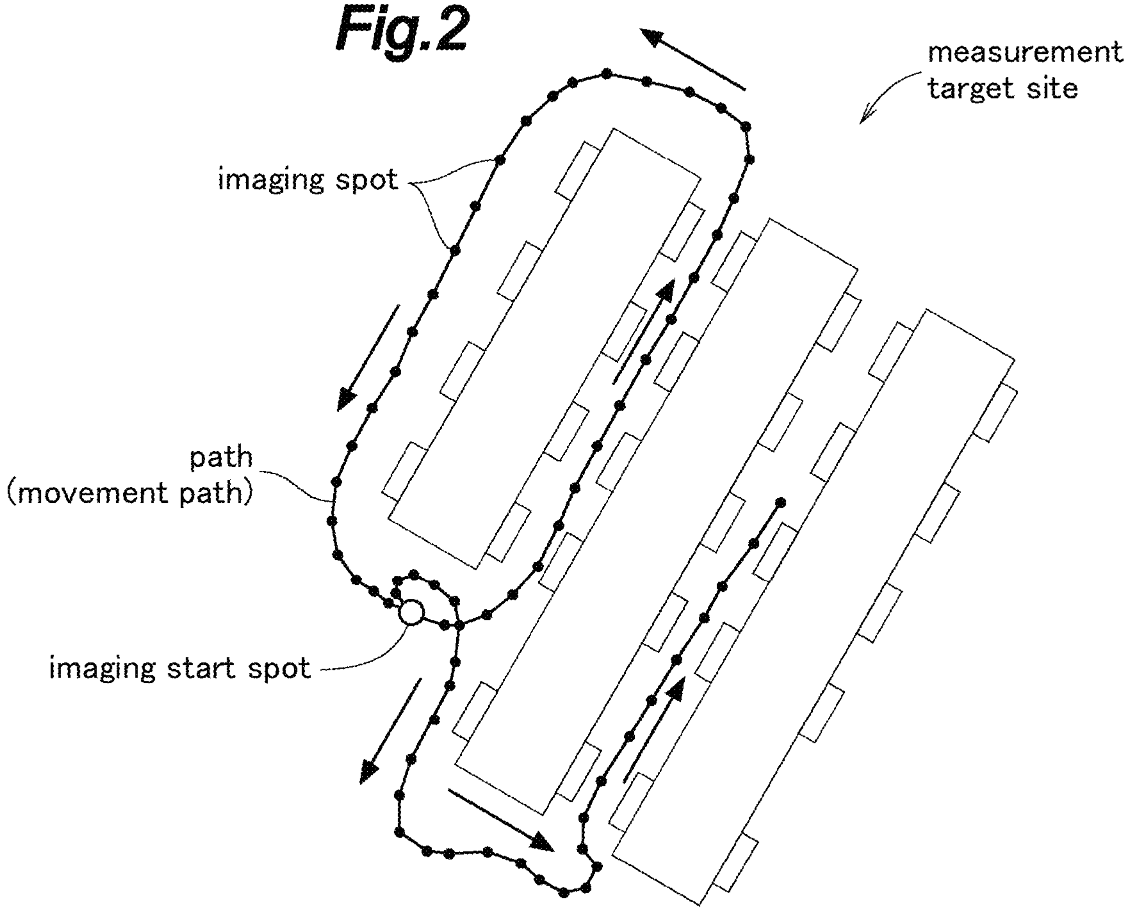
FIG. 2 is a plan view showing a measurement target site (i.e., a site to be measured)

FIG. 1 is an explanatory diagram showing a status of imaging work using an imaging device 1 in accordance with an embodiment of the present disclosure. FIG. 2 is a plan view showing a measurement target site (i.e., a site to be measured).

The imaging device 1 includes an imaging device body 11 and a sensor device 12. The sensor device 12 is equipped with a visible ray camera 21 (imaging module). The visible ray camera 21 is a monocular camera that detects visible light to capture an image of a subject, and outputs captured images, such as RGB color images. In addition, the imaging device 1 may be configured with a tablet terminal or a laptop PC.

A user (worker) walks around a measurement target site while holding the imaging device body 11 of the imaging device 1. The visible ray camera 21 of the imaging device 1 is caused to capture images of spots in the measurement target site on a spot-by-spot basis.

In the present embodiment, the imaging device 1 is a 3D measurement device. In other words, the imaging device 1 performs 3D measurement operations based on the images of the spots captured by the visible ray camera 21 on a spot-by-spot basis, to thereby generate 3D space information on the measurement target site. The 3D measurement operations are performed to generate point cloud image data (environmental map) as 3D space information on the measurement target site using an SLAM method. In addition to providing the point cloud image data, the 3D measurement operations involve a self-position estimation operation to estimate self-positions; that is, positions of imaging spots.

The imaging device 1 performs a loop closing operation upon detecting that the movement path of the device forms a loop, i.e., that the device has returned to a spot where an image has been previously captured. In the loop closing operation, assuming that a result of self position estimation operation (i.e., a past position acquired at the time of previous imaging) is a correct position of the previously imaged spot, correction is made to the position of each of the imaged spots on the movement path from the current position to the past position.

In the embodiment shown in FIG. 2, the imaging device starts imaging of spots from a start point and then moves around part of the measurement target site, before returning to the start point. The imaging device then continues to image another area in the measurement target site. In this case, the loop closing operation is performed when the imaging device returns to the start point. This improves the accuracy of point cloud image data and results of the self-position estimation operation for each imaging spot in the loop.

Figure 3:
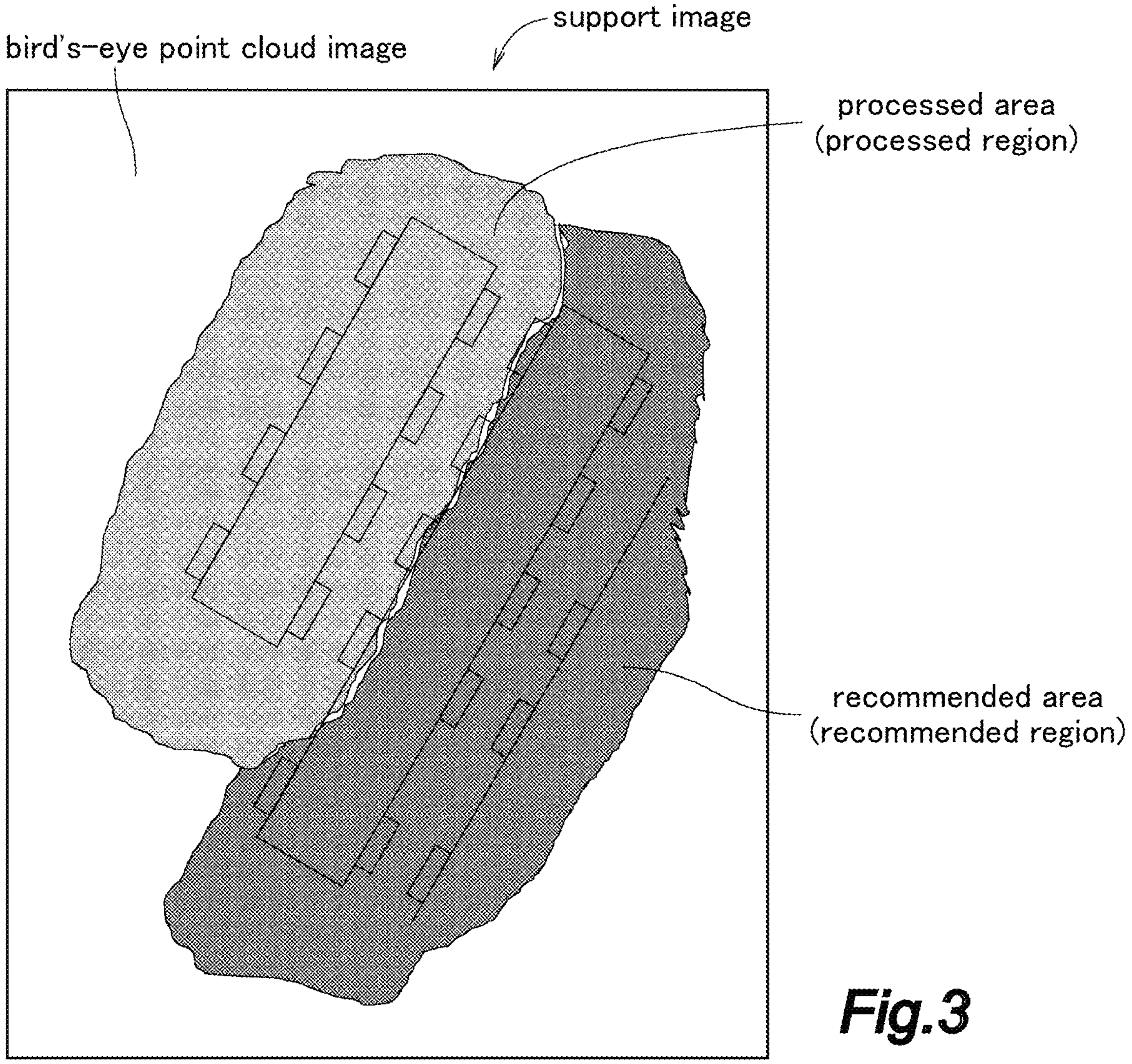
FIG. 3 is an explanatory diagram showing a support image which visualizes a processed region and a recommended region in a bird's-eye point cloud image.

Next, a support image which visualizes a processed region and a recommended region in a bird's-eye point cloud image will be described. FIG. 3 is an explanatory diagram showing a support image which visualizes a processed region and a recommended region in a bird's-eye point cloud image.

In the present embodiment, the imaging device generates a support image that visualizes a processed region and a recommended region in a bird's-eye point cloud image, and presents the support image to the user during the imaging work. The term "bird's-eye point cloud image" is an image (rendered image) indicating spots in the point cloud data as seen from an overhead viewpoint. The term "processed region" represents a region which has been subjected to the loop closing operation. The term "recommended region" represents a region for which the loop closing operation is recommended to be performed; that is, a region which has not been subjected to the loop closing operation or a region in which the accuracy of results of 3D measurements is low.

A processed area (processed region) and a recommended area (recommended region) are visualized in different colors. For example, a processed region is visualized in blue, and a recommended region is visualized in red. Specifically, in a bird's-eye point cloud image, points within a processed region are visualized in blue, and points within a recommended region are in red.

In the bird's-eye point cloud image, spots at which images are captured are visualized at a predetermined size and in a predetermined color. In some cases, a sphere of a predetermined diameter centered on each point may be rendered in a predetermined color. In other cases, a target space may be divided into cubic voxels, and voxels including imaged spots may be shown in a predetermined color.

The support image allows a user to grasp a region for which imaging work is required for the loop closing operation and conduct the imaging work. More specifically, the support image allows the user to conduct the imaging work to capture images of a recommended area, which is visualized in red. In other words, the user conducts the imaging work while moving through the recommended area. Specific conditions for the imaging work, such as a movement path are determined by the user as appropriate, depending on the situation at the site.

In this way, the imaging device of the present embodiment provides a support image that clearly indicates to a user that there is a region for which the loop closing operation is necessary. Moreover, the imaging device clearly presents to the user a region for which imaging work is required for the loop closing operation. This facilitates the user's proper imaging work and ensures that a loop closing operation is conducted, thereby improving the accuracy of a 3D measurement operation.

The processed area and recommended area both represent regions which have been imaged within the measurement target site. In other words, the areas other than the processed area and recommended area within the measurement target site are regions which have not been imaged. Thus, the support image allows a user to grasp regions which have not been imaged.

In the present embodiment, the number of times the loop closing operation has been performed is counted, and imaged areas are visualized (color-coded) according to a processing count which is the number of times the loop closing operation has been performed. For example, an area for which the processing count is one is visualized in green, and a region for which the processing count is two is visualized in blue, while one for which the processing count is zero in red.

Figure 4:
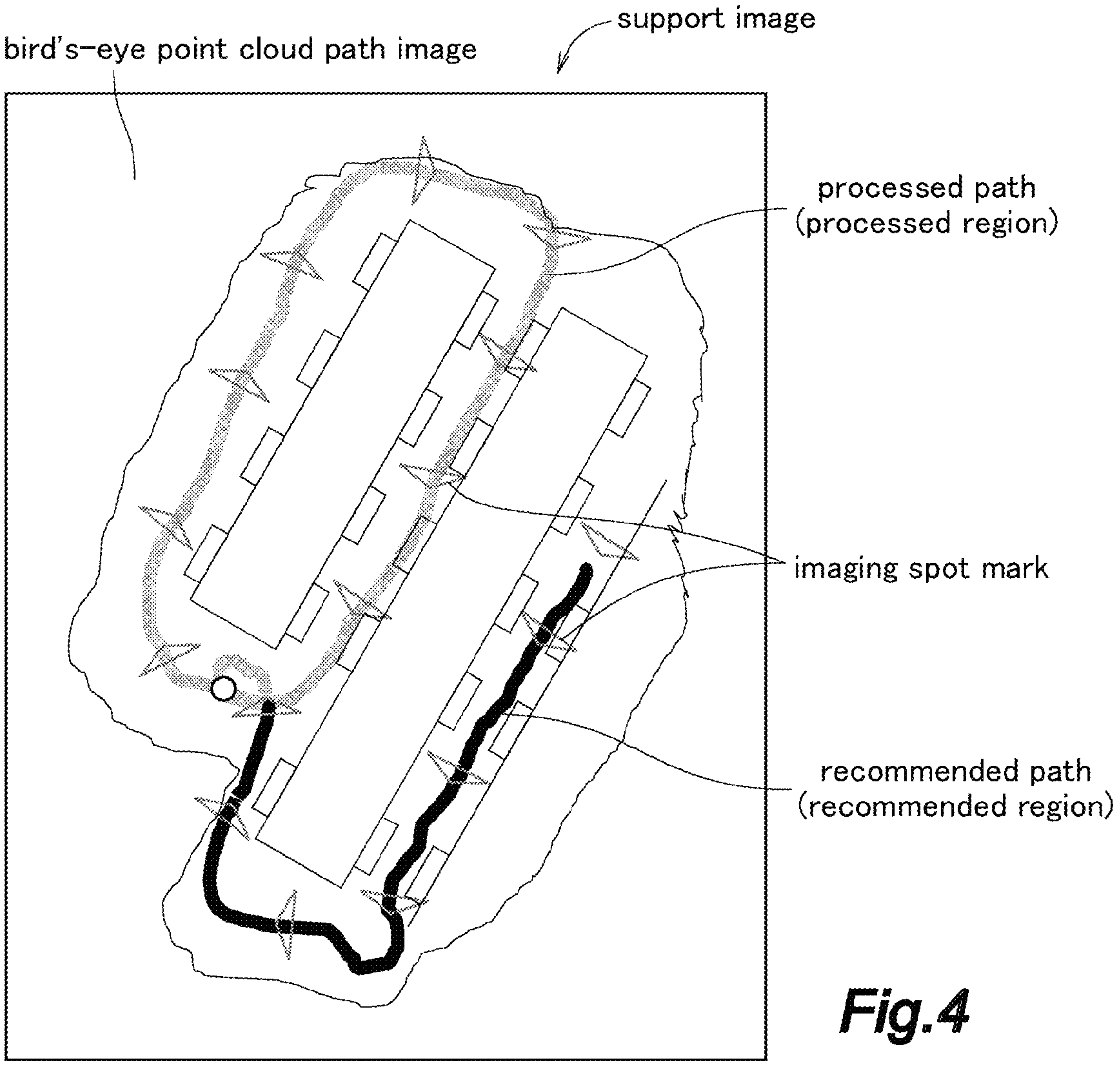
FIG. 4 is an explanatory diagram showing a support image which visualizes a processed region and a recommended region in a bird's-eye point cloud path image.

Next, a support image which visualizes a processed region and a recommended region in a bird's-eye point cloud path image will be described. FIG. 4 is an explanatory diagram showing a support image which visualizes a processed region and a recommended region in a bird's-eye point cloud path image.

The imaging device of the present embodiment generates a support image that visualizes a processed region and a recommended region in the bird's-eye point cloud path image and presents to the user the support image during the imaging work. The term "bird's-eye point cloud path image" is a bird's-eye point cloud image with a path (movement trajectory) overlaid thereon. The bird's-eye point cloud image is an image (rendered image) indicating spots in the point cloud data as seen from an overhead viewpoint. The path is a line that connects results of the self-position estimation operations based on captured images, i.e. the imaged spots, on the bird's-eye point cloud image.

The processed path (processed region) and recommended path (recommended region) are visualized in different colors. For example, the processed path is shown in blue, and the recommended path is shown in red.

The support image includes imaged spot symbols. The imaged spot symbols indicate the positions of imaged spots and the directions of imaging (angles at which images are captured). Specifically, each of the imaged spot symbols is shown as an isosceles triangle, and the apex of the isosceles triangle indicates the imaged spot, and the direction from the apex to the base indicates the direction of imaging.

The support image allows a user to grasp a region for which imaging work is required for the loop closing operation and conduct the imaging work. More specifically, the support image allows the user to conduct the imaging work to capture images in a recommended path, which is visualized in red. In other words, the user conducts the imaging work while moving through the recommended path.

In the present embodiment, the number of times the loop closing operation is performed is counted, and imaged areas are visualized (color-coded) according to a processing count which is the number of times the loop closing operation has been performed. For example, an area for which the processing count is one is visualized in green, and a region for which the processing count is two is visualized in blue, while one for which the processing count is zero in red.

Figure 5:
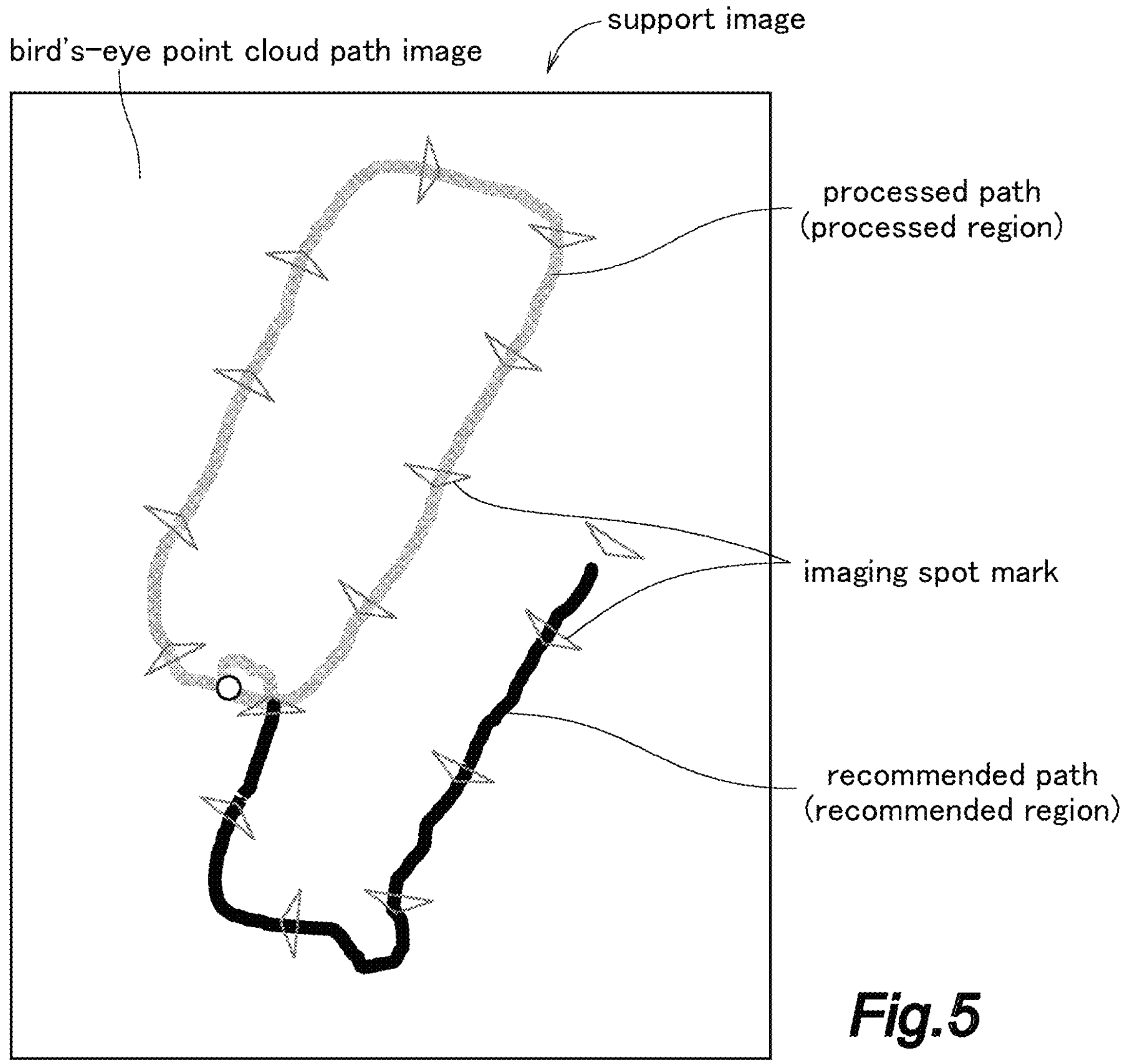
FIG. 5 is an explanatory diagram showing a support image which visualizes a processed region and a recommended region in a bird's-eye path image.

Next, a support image which visualizes a processed region and a recommended region in a bird's-eye point cloud path image will be described. FIG. 5 is an explanatory diagram showing a support image which visualizes a processed region and a recommended region in a bird's-eye path image.

The imaging device of the present embodiment generates a support image that visualizes a processed region and a recommended region in the bird's-eye point cloud path image and presents to the user the support image during the imaging work. The "bird's-eye path image" is an image which is formed by removing the bird's-eye point cloud image from the bird's-eye point cloud path image (FIG. 4), and which visualizes a line that connects results of the self-position estimation operations based on captured images, i.e. the imaged spots, as seen from an overhead viewpoint.

Figure 6:
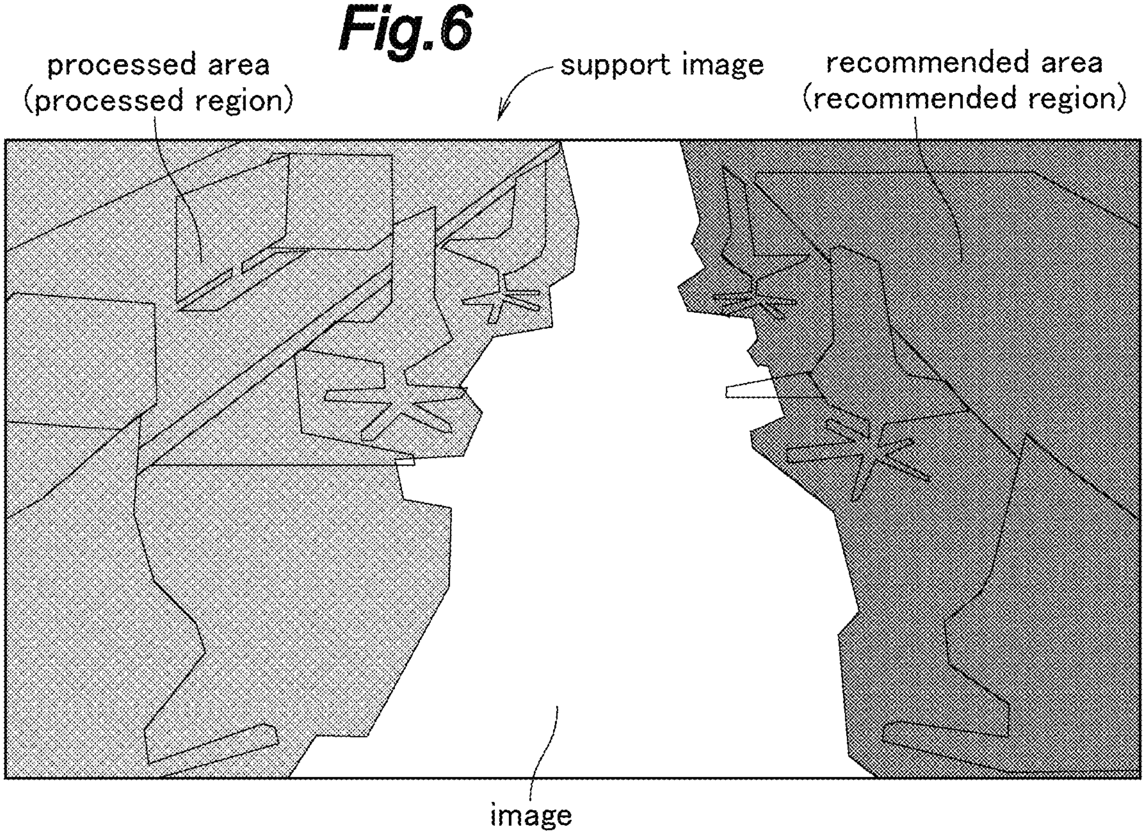
FIG. 6 is an explanatory diagram showing a support image which visualizes a processed region and a recommended region in a captured image.

Next, a support image which visualizes a processed region and a recommended region in a captured image will be described. FIG. 6 is an explanatory diagram showing a support image which visualizes a processed region and a recommended region in a captured image.

In the present embodiment, the imaging device generates a support image that visualizes a processed region and a recommended region in a captured image, and presents the support image to the user during the imaging work. The term "captured image" is a currently-captured image, i.e., an image that is captured and output from the visible ray camera 21 in real time.

A processed area (processed region) and a recommended area (recommended region) are visualized in different colors. For example, a processed region is visualized in blue, and a recommended region is visualized in red. Specifically, an image representing the processed area shown in a predetermined color and an image representing the recommended area shown in another predetermined color are overlaid on the captured image in a semi-transparent manner.

In this way, the imaging device of the present embodiment provides an image in which a processed region and a recommended region (unprocessed region) are visualized in the captured image. This allows a user to easily determine whether a visible area in front of the user is a processed region or a recommended region. The user then conducts the imaging work such that images of a recommended region are captured.

Figure 7:
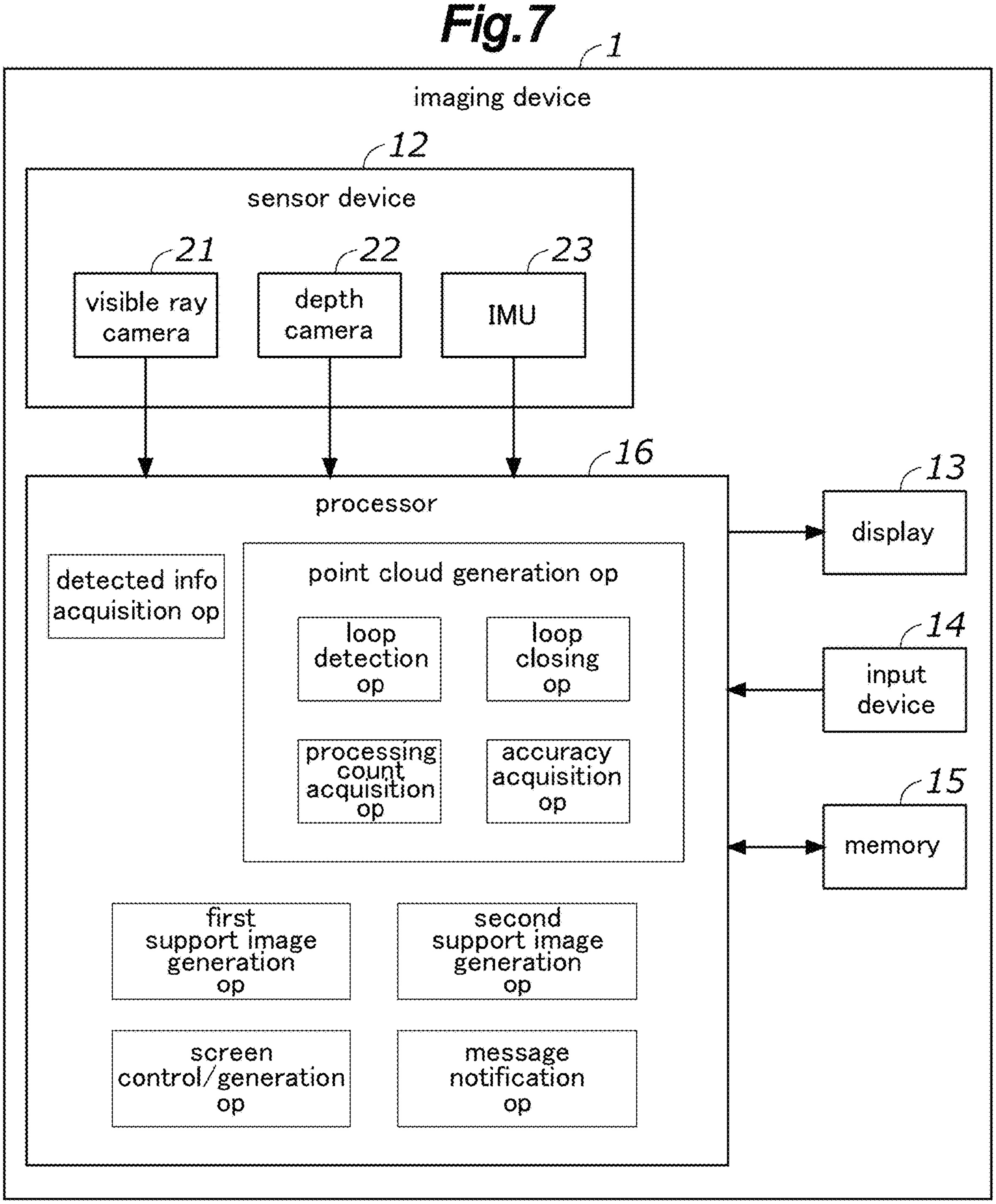
FIG. 7 is a block diagram showing a schematic configuration of an imaging device.

Next, a schematic configuration of the imaging device 1 will be described. FIG. 7 is a block diagram showing a schematic configuration of the imaging device 1.

The imaging device 1 includes, in addition to the sensor device 12, a display 13 (display module), an input device 14, a memory 15, and a processor 16 (CPU).

The sensor device 12 includes, in addition to the visible ray camera 21, a depth camera 22 and an IMU 23 (Inertial Measurement Unit). The depth camera 22 is a stereo camera that detects infrared light to capture images of a subject, and outputs depth information (distance images) as results of the detection. The results of the detection output from the depth camera 22 can be used to measure the distance to the subject. The IMU 23 detects 3D angular velocity and acceleration. Results of the detection from the IMU 23 can be used to measure the amounts of movement and rotation of the imaging device 1. In some embodiments, the visible ray camera 21, depth camera 22, and IMU 23 may not be integrated into a single sensor unit. In other embodiments, the sensor device 12 may be configured to include only the visible ray camera 21, without the depth camera 22 and IMU 23.

Figure 8:
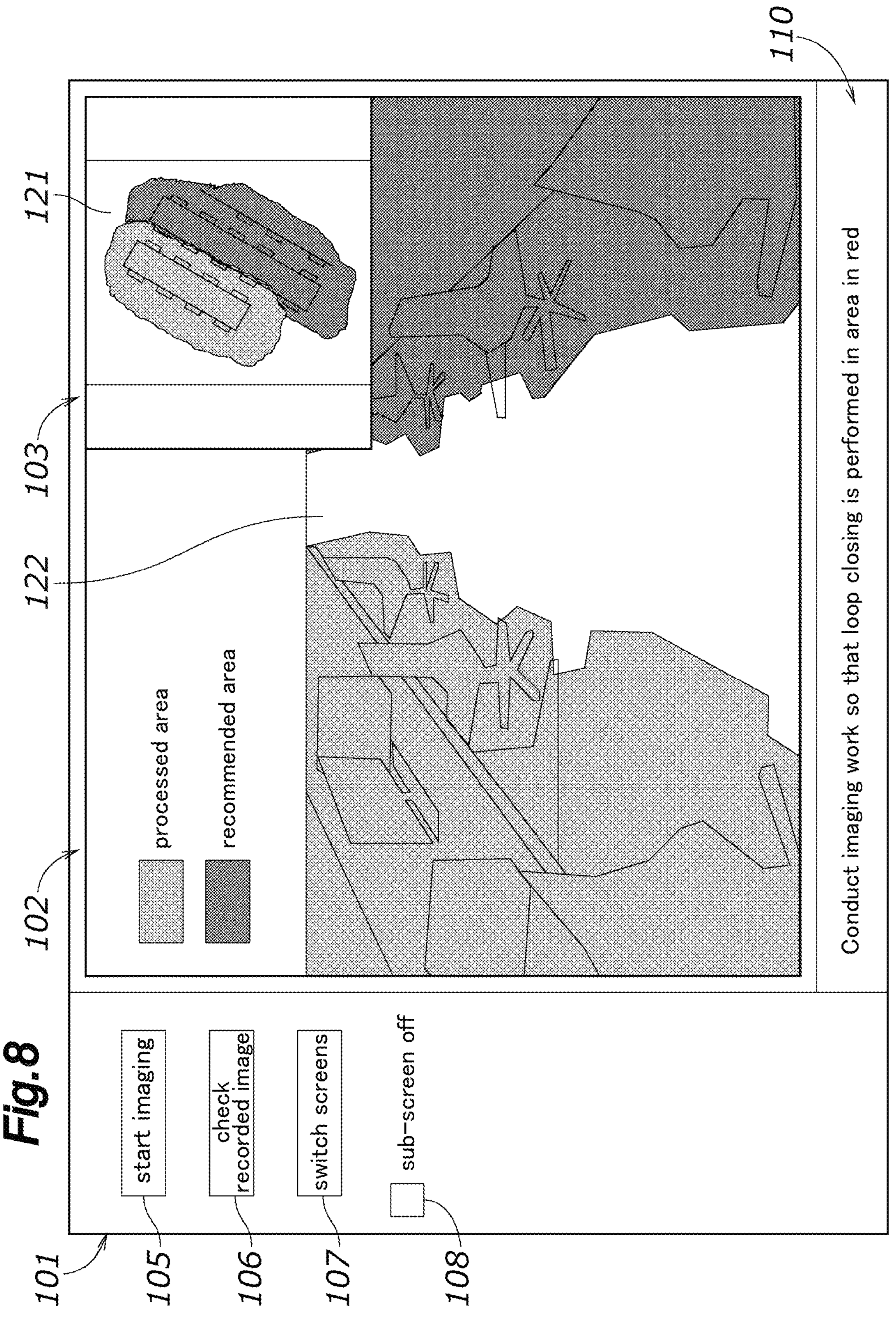
FIG. 8 is an explanatory diagram showing an imaging screen displayed on the display.
Figure 9:
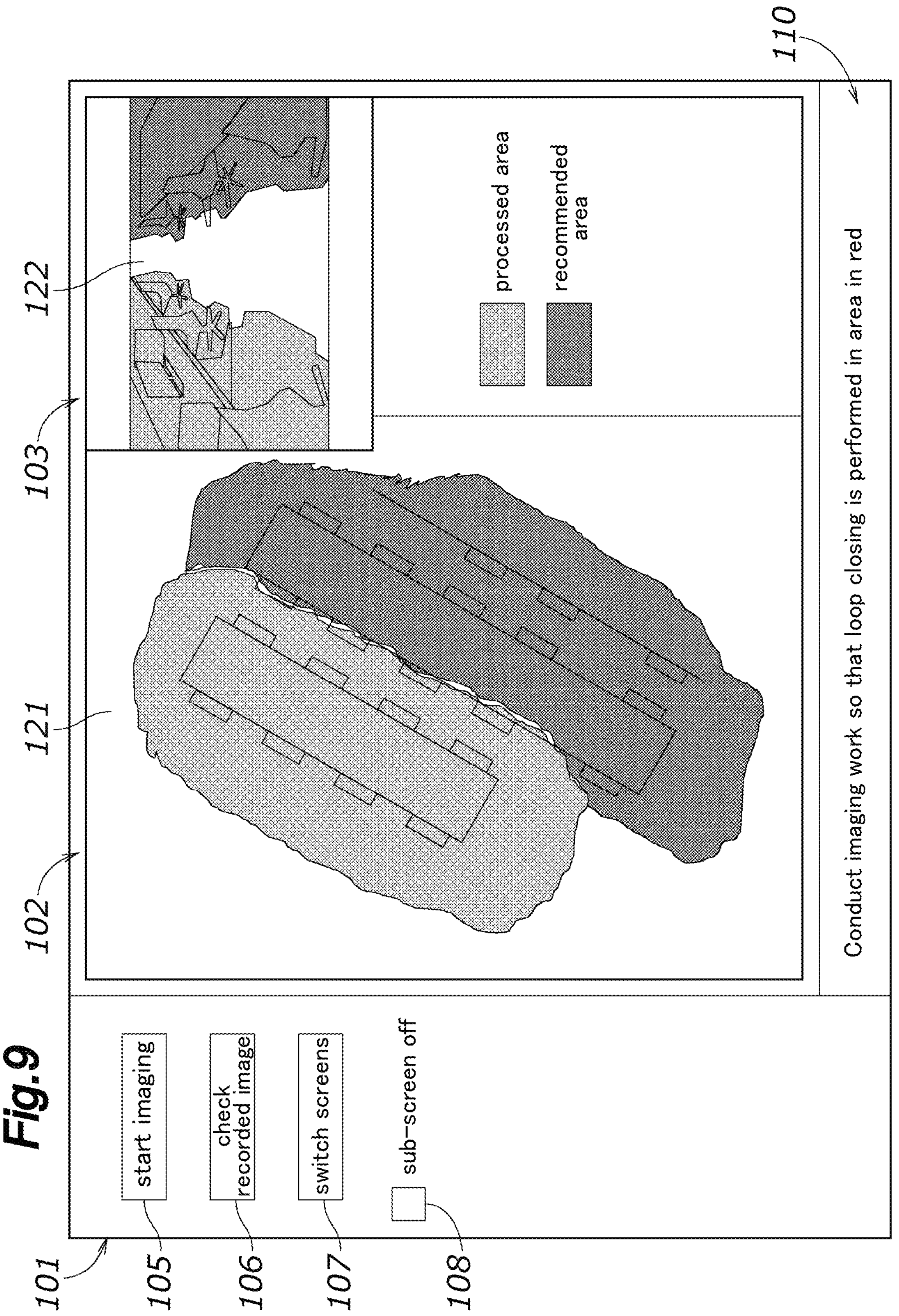
FIG. 9 is an explanatory diagram showing an imaging screen displayed on the display.

The display 13 displays screens such as an imaging screen 101 to present to a user various types of information related to the imaging work (FIGS. 8 and 9). The input device 14 is used by a user to perform input operations. The input device 14 may include a keyboard, a mouse, a touch pad, and a touch screen. The imaging device 1 which is implemented as a tablet includes a touch screen display consisting primarily of both a touch screen as the input device 14 and a display panel as the display 13.

The memory 15 stores computer-readable programs that is executable by a processor 16. The memory 15 also stores captured images provided from the visible ray camera 21, and results of the detection provided from the depth camera 22 and IMU 23. The memory 15 further stores results of the measurement generated by the processor 16.

The processor 16 performs various processing operations by executing the programs stored in the memory 15. In the present embodiment, the processor 16 performs operations such as a detected information acquisition operation, a point cloud generation operation, a first support image generation operation, a second support image generation operation, a screen control operation, and a message notification operation.

In the detected information acquisition operation, the processor 16 acquires captured images provided from the visible ray camera 21. In this operation, the processor 16 also acquires results of the detection provided from the depth camera 22 and IMU 23.

In the point cloud generation operation (3D measurement operations), based on the images of the spots captured by the visible ray camera 21 on a spot-by-spot basis, the processor 16 generates point cloud image data (environmental map) as 3D space information on the target site using an SLAM method. In addition to providing the point cloud image data, the point cloud generation operation involves a self-position estimation operation to estimate self-positions; that is, positions of imaging spots.

The point cloud generation operation includes a loop detection operation. In the loop detection operation, the processor 16 detects that the movement path of the device forms a loop, i.e., that the device has returned to a spot where an image has been previously captured. The detection of a spot where an image has been previously captured does not involve comparing the currently-captured image with a preset specific captured image, but involves detecting that the currently-captured image is similar to a past captured image to thereby determine that the imaging device has returned to a corresponding spot where an image has been previously captured. This similarity may be determined based on feature amounts extracted from captured images.

The point cloud generation operation includes a loop closing operation. When detecting a loop in the loop detection operation, the processor 16 performs the loop closing operation. In the loop closing operation, assuming that a result of self-position estimation operation (i.e., a past position acquired at the time of previous imaging) is a correct position of the previously imaged spot, the processor 16 corrects the position of each of the imaged spots on the movement path from the current position to the past position.

The point cloud generation operation includes a processing count acquisition operation. In the processing count acquisition operation, the processor 16 counts the number of times the loop closing operation has been performed for each of the imaged spots. Processing count information (i.e., information on a processing count which is the number of times the loop closing operation has been performed) is added to a captured image (frame) for each of the imaged spots. The processing count information includes information on whether or not the loop closing operation has been performed; that is, a processing count of zero means that the loop closing operation has not been performed, while a processing count of one or more means that the loop closing operation has been performed at least once.

The point cloud generation operation includes an accuracy acquisition operation. In the accuracy acquisition operation, the processor 16 acquires the accuracy of results of 3D measurements (point cloud image data and results of the self-position estimation operation) for each of the imaged spots. Specifically, the processor 16 acquires the accuracy for each imaged spot based on a distant amount from a spot where the loop closing operation has been performed. Specifically, the "distant amount" may be determined as the distance of movement from a spot where the loop closing operation was performed (the length of movement trajectory), the time that has elapsed since the loop closing operation was performed, or the number of frames (number of images) captured since the loop closing operation was performed. In some embodiments, the distance of movement, the time, and the number of frames may be used in combination as a basis for the determination of accuracy. In some cases, the distance of movement may be combined with the speed of movement to determine the accuracy. Accuracy information (i.e., information on the determined accuracy) is added to the captured image (frame) for each of the imaged spots. In some cases, the accuracy information may be added to data of each point in the point cloud image data.

The processor is capable of acquiring the accuracy information for each point in the point cloud image data, regardless of whether or not and how many times the loop closing operation has been performed for the point. For example, when the results of measurement (point cloud image data) based on images captured at the imaged spots do not match the results of detection provided from the depth camera 22 or IMU 23, the processor may determine that the accuracy is low. In other embodiments, the processor determines the accuracy by comparing the results of measurement based on previous and next captured images (frames). In this case, the accuracy information is added to data of each point in the point cloud image data.

The point cloud generation operation may use results of detection provided from the depth camera 22 and the IMU 23, in addition to the images captured by the visible ray camera 21. Specifically, based on the results of detection provided from the depth camera 22, the processor 16 can acquire relative position information which is information on the position of each of the feature points extracted from the images captured by the visible ray camera 21 relative to the position of the imaging device 1 (the distance from the imaging device 1), and can correct the self-position estimation results based on the images captured by the visible ray camera 21. In other cases, based on the results of detection provided from the IMU 23, the processor 16 can acquire relative position information for each imaged spot, and use the acquired relative position information to correct the self-position estimation results based on the images captured by the visible ray camera 21.

In the first support image generation operation, the processor 16 generates a support image (first support image) in which the processed region and recommended region are visualized in the bird's-eye image. Specifically, the processor 16 generates a support image in which the processed region and recommended region are visualized in the bird's-eye point cloud image (FIG. 3), a support image in which the processed region and recommended region are visualized in the bird's-eye point cloud path image (FIG. 4), and a support image in which the processed region and recommended region are visualized in the bird's-eye path image (FIG. 5).

In the visualization of a processed region and a recommended region in the bird's-eye point cloud image, the processor 16 acquires information on the processed region and recommended region based on the processing count information added to data of each point in the point cloud image data, and colors points within the processed region and recommended region in the point cloud image (point cloud image coloring operation).

In the visualization of a processed region and a recommended region in the bird's-eye point cloud path image or the bird's-eye path image, the processor 16 colors the image of a path (movement trajectory) connecting the positions of imaged spots based on the processing count information added to the captured images (frames) of the imaged spots (path image coloring operation).

In the present embodiment, in the visualization of a recommended region in the bird's-eye point cloud image, the processor 16 determines an area with low accuracies of the results of 3D measurement operations as a recommended region, and colors the points with low accuracies in the color of the recommended region based on the accuracy information added to data of each point in the point cloud image data. In some cases, the processor 16 may extract an area with a larger amount of points with low accuracies in the point cloud image data as a recommended region.

In the present embodiment, in the visualization of a recommended region in the bird's-eye point cloud path image or bird's-eye path image, the processor 16 determines a region with low accuracies in a path connecting the positions of imaged spots as a recommended region, and, based on the accuracy information added to the captured image (frame) of each of the imaged spots, acquires information indicating the recommended region and colors the path image.

In the second support image generation operation, the processor 16 generates a support image (second support image) in which a processed region and recommended region are visualized in a captured image (FIG. 6). Specifically, the processor 16 generates an image representing the processed area shown in a predetermined color and an image representing the recommended area shown in another predetermined color (overlaid image generation operation), and overlays these images on the captured image in a semi-transparent manner. In the overlaid image generation operation, the processor 16 may acquire information indicating the respective regions of a processed area and a recommended area based on the processing count information for each point in the point cloud image data, i.e., data of image viewed from the same viewpoint as the captured image.

In the screen control operation, the processor 16 controls the screen displayed on the display 13. In the present embodiment, the processor 16 generates an imaging screen 101 (FIGS. 8 and 9) and causes the display 13 to display the generated imaging screen 101. The imaging screen 101 shows a first support image (FIGS. 3, 4 and 5) generated in the first support image generation operation and a second support image (FIG. 6) generated in the second support image generation operation.

In the message notification operation, the processor 16 performs operations to notify a user of messages providing imaging work assistance and various alerts. In the present embodiment, the processor 16 displays a message on the imaging screen 101 (FIGS. 8 and 9) prompting a user to conduct imaging work for the loop closing operation.

Such a message is displayed when a predetermined notification condition is met. For example, a message is displayed when the amount of movement from a spot where the loop closing operation was performed exceeds a predetermined threshold, and a message is also displayed when the elapsed time since the loop closing operation was performed exceeds a predetermined threshold. In this case, the amount of movement and elapsed time are indicators for evaluating the decrease in the accuracy of results of 3D measurement, and when the amount of movement or the elapsed time exceeds the corresponding threshold value, the processor determines that the decrease in accuracy has exceeded an acceptable limit and causes the display to indicate a message for improvement of the accuracy. In some cases, a message may be displayed at all times.

In the present embodiment, the imaging device 1 performs the 3D measurement operation (point cloud generation operation). However, the 3D measurement operation may also be performed by a server device (not shown) that can communicate with the imaging device 1.

Next, an imaging screen 101 displayed on the display 13 will be described. FIGS. 8 and 9 are explanatory diagrams showing the imaging screen 101.

The imaging screen 101 includes a main window 102 (main image display frame) and a sub-window 103 (sub-image display frame). The main window 102 and the sub-window 103 indicate images with different display magnifications; that is, the image being enlarged in the main window 102 and reduced in the sub-window 103.

The main window 102 and sub-window 103 display a first support image 121 and a second support image 122, respectively. In the imaging screen 101 shown in FIG. 8, the second support image 122 is enlarged and displayed in the main window 102, and the first support image 121 is reduced and displayed in the sub-window 103. In the imaging screen 101 shown in FIG. 9, the first support image 121 is enlarged and displayed in the main window 102, and the second support image 122 is reduced and displayed in the sub-window 103.

The first support image 121 includes a support image in which a processed region and recommended region are visualized in a bird's-eye point cloud image (FIG. 3), a support image in which a processed region and recommended region are visualized in a bird's-eye point cloud path image (FIG. 4), and a support image in which a processed region and recommended region are visualized in a bird's-eye path image (FIG. 5), and the imaging screen displays one of these types of images according to the settings. In the examples shown in FIGS. 8 and 9, the first support image 121 is a support image in which a processed region and recommended region are visualized in a bird's-eye point cloud image (FIG. 3).

The second support image 122 is a support image (FIG. 6) in which a processed region and recommended region are visualized in a captured image. This captured image is an image captured and output from the visible ray camera 21 in real time.

In some cases, either the first support image 121 or the second support image 122 in the main window 102 and sub-window 103 may be displayed as is; that is, displayed as a bird's-eye image (bird's-eye point cloud image, bird's-eye point cloud path image, bird's-eye path image), or a captured image, without any processed region and recommended region being visualized. The imaging device 1 may be configured to allow a user to preset whether or not a processed region and recommended region are visualized in each of the main window 102 and sub-window 103.

The imaging screen 101 includes a "start imaging" button 105 and a "check recorded image" button 106. When a user operates the "start imaging" button 105, the imaging device 1 starts imaging with the visible ray camera 21 and stores captured images in the memory 15. When a user operates the "check recorded image" button 106, the device's operation mode changes such that the imaging device plays back in the captured images stored in the memory 15. This feature allows a user to check whether or not the imaging/image-recording has been properly performed.

The imaging screen 101 includes a "switch screens" button 107, and a checkbox 108 used to control the sub-window 103. This feature allows a user to operate the "switch screens" button 107, thereby switching the imaging screen 101 between a status shown in FIG. 8 and a status shown in FIG. 9. In other words, the imaging screen 101 is switched between the status in which the captured image is displayed in the main window 102 and the bird's-eye view map is displayed in the sub-window 103 and the status in which the bird's-eye view map is displayed in the main window 102 and the captured image is displayed in the sub-window 103. When a user checks the checkbox 108, the status of the imaging screen 101 transitions such that the sub-window 103 is not displayed.

The imaging screen 101 includes a message window 110. The message window 110 indicates messages to notify a user. Specifically, the message window 110 indicates messages providing imaging work assistance and various alerts.

In particular, when there is an area for which the loop closing operation is recommended to be performed during imaging work, i.e., an area which has not been subjected to the loop closing operation or an area in which the accuracy of results of 3D measurements is low, the imaging screen 101 indicates a support message which prompts a user to conduct imaging work in a recommended region, which is visualized in red. In the example shown in FIGS. 8 and 9, the imaging screen 101 indicates a message "Conduct imaging work so that loop closing is performed in area in red"

In this way, the imaging device of the present embodiment causes the imaging screen 101 to display a captured image in real time. This allows a user to know a current status of imaging work. Furthermore, the imaging device of the present embodiment provides an image in which a processed region and a recommended region (unprocessed region) are visualized in the captured image. This allows a user to easily determine whether a visible area in front of the user is a processed region or a recommended region.

In the present embodiment, methods of visualizing a recommended region include visualizing (coloring) an unprocessed region which has not been subjected to the loop closing operation, as the recommended region, and visualizing a region in which the accuracy of results of the 3D measurement operation is low, as the recommended region. The imaging device is configured to allow these two methods of recommended region visualization to be switched as appropriate. For example, the method of recommended region visualization may be preset in a settings screen (not shown). The imaging device may be configured to allow a user to select one of the methods of recommended region visualization on the imaging screen 101.

While specific embodiments of the present disclosure are described herein for illustrative purposes, the present disclosure is not limited to those specific embodiments. Various changes, substitutions, additions, and omissions may be made to elements of the embodiments without departing from the scope of the invention. Moreover, elements and features of the different embodiments may be combined with each other to yield another embodiment of the present disclosure.

INDUSTRIAL APPLICABILITY

An imaging device, an imaging work assistance method and an imaging work assistance program according to the present disclosure, have an effect of clearly indicating that there is a region for which a loop closing operation is necessary, to a user conducting imaging work to facilitate proper imaging work, thereby improving the accuracy of a 3D measurement operation using SLAM, and are useful as an imaging device for imaging spots in a measurement target site, thereby allowing a 3D measurement operation to be performed for generating 3D space information on the measurement target site based on captured images of the spots therein, as well as an imaging work assistance method and an imaging work assistance program for assisting a user to conduct imaging work using the imaging device.

Glossary

1 imaging device
11 imaging device body
12 sensor device
13 display (display device)
14 input device
15 memory
16 processor
21 visible ray camera (imaging module)
101 imaging screen
102 main window (main image display frame)
103 sub-window (sub-image display frame)
110 message window
121 first support image
122 second support image

The invention claimed is:

1. An imaging device for imaging spots in a measurement target site, thereby allowing a 3D measurement operation to be performed for generating 3D space information on the measurement target site based on captured images of the spots therein, the imaging device comprising:

an imaging device body held by a user;

an imaging module provided in the imaging device body to image the measurement target site;

a display device for displaying support information related to imaging work to be conducted by the user, the imaging work including, while moving in the measurement target site with holding the imaging device body, causing the imaging module to image spots in the measurement target site on a spot-by-spot basis; and a processor for controlling the imaging module and the display device, wherein the processor causes a support image which visualizes a processed region which has been subjected to a loop closing operation in the 3D measurement operation to be displayed on the display device as the support information.

2. The imaging device as claimed in claim 1, wherein the processor causes the support image, which visualizes the processed region, which has been subjected to the loop closing operation in a currently captured image and/or a bird's-eye image generated from results of the 3D measurement operation, to be displayed on the display device.

3. The imaging device as claimed in claim 1, wherein the processor visualizes the processed region, which has been subjected to the loop closing operation, in a different display form from a recommended region for which the loop closing operation is recommended to be performed.

4. The imaging device as claimed in claim 1, wherein the processor acquires a number of times the loop closing operation has been performed in the processed region, which has been subjected to the loop closing operation.

5. The imaging device as claimed in claim 2, wherein the processor changes a display form in which the processed region, which has been subjected to the loop closing operation, is displayed, depending on a number of times the loop closing operation has been performed.

6. The imaging device as claimed in claim 1, wherein the processor generates a support message that prompts the user to conduct the imaging work required for the loop closing operation in the 3D measurement operation, and causes the support message to be displayed on the display device as the support information.

7. The imaging device as claimed in claim 6, wherein the processor generates the support message that prompts the user to conduct the imaging work with a recommended region for which the loop closing operation is recommended to be performed, and causes the support message to be displayed on the display device.

8. The imaging device as claimed in claim 6, wherein the processor causes the support image which visualizes a recommended region for which the loop closing operation is recommended to be performed in a currently captured image and/or a bird's-eye image generated from results of the 3D measurement operation, to be displayed on the display device.

9. The imaging device as claimed in claim 6, wherein the processor enlarges one of a currently captured image and/or a bird's-eye image generated from results of the 3D measurement operation and places the enlarged image in a main image display frame and reduces the other and places the reduced image in a sub-image display frame, and wherein, in response to the user's operation, the processor switches the places of the currently captured image and the bird's-eye image, between the main image display frame and sub-image display frame.

10. The imaging device as claimed in claim 9, wherein, in response to the user's operation, the processor makes the sub-image display frame hidden.

11. The imaging device as claimed in claim 1, wherein the processor causes a support image which visualizes a recommended region for which the loop closing operation is recommended to be performed in the 3D measurement operation, to be displayed on the display device as the support information.

12. The imaging device as claimed in claim 11, wherein the processor visualizes an unprocessed region which has not been subjected to the loop closing operation, as the recommended region, for which the loop closing operation is recommended to be performed.

13. The imaging device as claimed in claim 11, wherein the processor visualizes a region in which the accuracy of the results of the 3D measurement operation is low, as the recommended region, for which the loop closing operation is recommended to be performed.

14. The imaging device as claimed in claim 11, wherein the processor visualizes the recommended region, for which the loop closing operation is recommended to be performed, in a different display form from the processed region, which has been subjected to the loop closing operation.

15. An imaging work assistance method in which a processor performs operations to assist a user to conduct imaging work which includes, while moving in a measurement target site with holding an imaging device, causing the imaging device to image spots in the measurement target site on a spot-by-spot basis, thereby allowing a 3D measurement operation to be performed for generating 3D space information on the measurement target site based on captured images of the spots therein, the method comprising:

the processor causing a support image which visualizes a processed region which has been subjected to a loop closing operation in the 3D measurement operation to be displayed on a display device as support information related to the imaging work.

16. The method as claimed in claim 15, wherein the processor generates a support message that prompts the user to conduct the imaging work required for the loop closing operation in the 3D measurement operation, and causes the support message to be displayed on the display device as the support information related to the imaging work.

17. The method as claimed in claim 15, wherein the processor causes the support image which visualizes a recommended region for which the loop closing operation is recommended to be performed, to be displayed on the display device as the support information related to the imaging work.

18. A non-transitory computer-readable storage medium storing an imaging work assistance program that causes a processor to perform operations to assist a user to conduct imaging work which includes, while moving in a measurement target site with holding an imaging device, causing the imaging device to image spots in the measurement target site on a spot-by-spot basis, thereby allowing a 3D measurement operation to be performed for generating 3D space information on the measurement target site based on captured images of the spots therein, the operations comprising:

causing a support image which visualizes a processed region which has been subjected to a loop closing operation in the 3D measurement operation, to be displayed on a display device as support information related to the imaging work.

19. The non-transitory computer-readable storage medium as claimed in claim 18, wherein the operations comprise generating a support message that prompts the user to conduct the imaging work required for the loop closing operation in the 3D measurement operation, and causing the support message to be displayed on the display device as the support information related to the imaging work.

20. The non-transitory computer-readable storage medium as claimed in claim 18, wherein the operations comprise causing the support image which visualizes a recommended region for which the loop closing operation is recommended to be performed, to be displayed on the display device as the support information related to the imaging work.

* * * * *